US008019288B2

(12) United States Patent
Yu et al.

(10) Patent No.: US 8,019,288 B2
(45) Date of Patent: Sep. 13, 2011

(54) APPARATUS AND METHOD FOR COOPERATIVE RELAY IN A WIRELESS COMMUNICATION SYSTEM BASED ON RELAY STATIONS

(75) Inventors: Tak-Ki Yu, Yongin-si (KR); Yung-Soo Kim, Seongnam-si (KR); Myeon-Kyun Cho, Seongnam-si (KR); Sae-Young Chung, Daejeon (KR); Muryong Kim, Daejeon (KR)

(73) Assignees: Samsung Electronics Co., Ltd., Suwon-si (KR); Korea Advanced Institute of Science and Technology, Daejeon (KR)

( * ) Notice: Subject to any disclaimer, the term of this patent is extended or adjusted under 35 U.S.C. 154(b) by 496 days.

(21) Appl. No.: 12/228,486

(22) Filed: Aug. 13, 2008

(65) Prior Publication Data
US 2009/0047901 A1 Feb. 19, 2009

(30) Foreign Application Priority Data

Aug. 14, 2007 (KR) ........................ 10-2007-0081770

(51) Int. Cl.
*H04B 1/00* (2006.01)
*H04B 7/00* (2006.01)

(52) U.S. Cl. .... 455/69; 455/63.1; 455/67.11; 455/67.13; 455/11.1; 455/450; 455/452.2; 370/315; 370/329; 370/279; 375/211; 375/267; 375/299

(58) Field of Classification Search ................... 455/69, 455/63.1, 67.13, 522, 11.1, 7, 450, 452.2, 455/67.11; 370/315, 328–329, 279, 277, 370/229
See application file for complete search history.

(56) References Cited

U.S. PATENT DOCUMENTS

| | | | |
|---|---|---|---|
| 6,161,014 A * | 12/2000 | Girardeau et al. | 455/436 |
| 7,295,850 B2 * | 11/2007 | Pedersen | 455/515 |
| 7,545,765 B2 * | 6/2009 | Larsson et al. | 370/328 |
| 7,555,035 B2 * | 6/2009 | Shi et al. | 375/211 |
| 7,733,813 B2 * | 6/2010 | Shin et al. | 370/278 |
| 7,848,774 B2 * | 12/2010 | Park | 455/550.1 |

* cited by examiner

*Primary Examiner* — Marceau Milord

(57) ABSTRACT

An apparatus and method for cooperative relay in a multiple-antenna wireless communication system based on relay stations (RSs) are provided. The apparatus includes a serial/parallel converter for dividing data into N number of streams, a channel estimator for calculating a first transmission rate at which a RS performing the cooperative relay can perform decoding and a second transmission rate at which all relay stations performing the cooperative relay can commonly perform decoding, and determining transmission rates for each of the N-number streams, and an adaptive modulation and coding (AMC) unit for encoding and modulating the N-number streams according to their respective transmission rates.

18 Claims, 8 Drawing Sheets

APPARATUS AND METHOD FOR COOPERATIVE RELAY IN A WIRELESS COMMUNICATION SYSTEM BASED ON RELAY STATIONS

CROSS-REFERENCE TO RELATED APPLICATION(S) AND CLAIM OF PRIORITY

This application claims priority under 35 U.S.C. §119(a) to a Korean Patent Application filed in the Korean Intellectual Property Office on Aug. 14, 2007 and assigned Serial No. 2007-81770, the contents of which are herein incorporated by reference.

TECHNICAL FIELD OF THE INVENTION

The present invention relates generally to an apparatus and method for cooperative relay in a multiple-antenna wireless communication system based on relay stations (RSs) and, in particular, to an apparatus and method for cooperative relay for improving the reliability of signal transmission and maximizing throughput.

BACKGROUND OF THE INVENTION

An orthogonal transmission scheme, such as time division and frequency division, or a space time coding (STC) scheme, such as an Alamouti scheme, can be used to avoid interference among signals transmitted to each relay station (RS). These schemes designed in a single-antenna wireless communication system are focused on improving the reliability of signal transmission using path diversity.

The use of multiple antennas leads to a sudden increase in the capacity and reliability of a wireless communication in a fading channel. Although multiple input multiple output (MIMO) technology has many merits, the chance of its realization is thin because of cost or hardware limitation. For this reason, in recent years, many researches seeking an alternative to a multiple-antenna system are in progress. With the increase of attention to a wireless network for an RS, a cooperative communication that is one of traditional technologies is emerging as an alternative for obtaining a transmission diversity gain or a multiplexing gain. Its basic idea is that a plurality of users share each other's antennas to construct a virtual MIMO channel in a dispersive scheme.

However, in the convention art, RSs have to decide to perform cooperative communication for obtaining a diversity gain or to perform cooperative communication for obtaining a multiplexing gain under the control of a base station (BS).

Thus, the conventional art has a problem in that the reliability of signal transmission increases but a spectral efficiency decreases or, inversely, a spectral efficiency increases but the reliability of signal transmission is not guaranteed.

SUMMARY OF THE INVENTION

To address the above-discussed deficiencies of the prior art, it is a primary object of the present invention to substantially solve at least the above problems and/or disadvantages and to provide at least the advantages below. Accordingly, one aspect of the present invention is to provide an apparatus and method for cooperative relay for improving the reliability of signal transmission and maximizing throughput.

The above aspects are achieved by providing an apparatus and method for cooperative relay in a multiple-antenna wireless communication system based on relay stations (RSs).

According to one aspect of the present invention, a transmit apparatus for cooperative relay in a multiple-antenna wireless communication system based on relay stations (RSs) is provided. The apparatus includes a serial/parallel converter for dividing data into N number of streams, a channel estimator for calculating a first transmission rate at which each RS performing the cooperative relay can perform decoding and a second transmission rate at which RSs performing the cooperative relay can commonly perform decoding, and determining transmission rates of the N-number streams, and an adaptive modulation and coding (AMC) unit for encoding and modulating the N-number streams according to the transmission rates.

According to another aspect of the present invention, a relay reception apparatus for cooperative relay in a multiple-antenna wireless communication system based on relay stations (RSs) is provided. The apparatus includes a first decoder for decoding a common signal in a received signal that comprises a private signal and the common signal, and a second decoder for removing the decoded common signal from the received signal and decoding the private signal.

According to a further aspect of the present invention, a relay receive apparatus for cooperative relay in a multiple-antenna wireless communication system based on relay stations (RSs) is provided. The apparatus includes an encoder/modulator for re-encoding and re-modulating the decoded private signal and the common signal on the basis of a channel estimation, and a signal synthesizer for applying a parameter for controlling a multiplexing gain and a diversity gain to the re-encoded and re-modulated private signal and common signal and synthesizing the two signals.

According to still another aspect of the present invention, a receive apparatus for cooperative relay in a multiple-antenna wireless communication system based on relay stations (RSs) is provided. The apparatus includes a first detector for receiving a cooperative relay signal from a plurality of RSs and detecting a common signal in the cooperative relay signal on the basis of a corresponding channel estimation information, a first decoder for decoding the detected common signal, an Nth detector for multiplying the decoded common signal by a corresponding channel matrix and sequentially detecting private signals on the basis of corresponding channel estimation information among a signal obtained by removing the common signal from the cooperative relay signal, and an Nth decoder for decoding the detected private signals.

According to still another aspect of the present invention, a transmission method for cooperative relay in a multiple-antenna wireless communication system based on relay stations (RSs) is provided. The method includes dividing data into N number of streams, calculating a first transmission rate at which each RS performing the cooperative relay can perform decoding and a second transmission rate at which RSs performing the cooperative relay can perform decoding, and determining transmission rates of the N-number streams, and encoding and modulating the N-number streams according to the transmission rates.

According to still another aspect of the present invention, a relay reception method for cooperative relay in a multiple-antenna wireless communication system based on relay stations (RSs) is provided. The method includes decoding a common signal in a received signal that comprises a private signal and the common signal, and removing the decoded common signal from the received signal and decoding the private signal.

According to still another aspect of the present invention, a relay transmission method for cooperative relay in a multiple-antenna wireless communication system based on relay stations (RSs) is provided. The method includes re-encoding and re-modulating the decoded private signal and common signal on the basis of a channel estimation, and applying a parameter for controlling a multiplexing gain and a diversity gain to the re-encoded and re-modulated private signal and common signal and synthesizing the two signals.

According to still another aspect of the present invention, a reception method for cooperative relay in a multiple-antenna wireless communication system based on relay stations (RSs) is provided. The method includes receiving a cooperative relay signal from a plurality of RSs and detecting a common signal from the cooperative relay signal on the basis of a corresponding channel estimation information, decoding the detected common signal, multiplying the decoded common signal by a corresponding channel matrix and sequentially detecting private signals on the basis of the corresponding channel estimation information among a signal obtained by removing the common signal from the cooperative relay signal, and decoding the detected private signals.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 8, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

An apparatus and method for cooperative relay for improving the reliability of signal transmission and maximizing throughput according to an exemplary embodiment of the present invention are described below.

Figure 1:
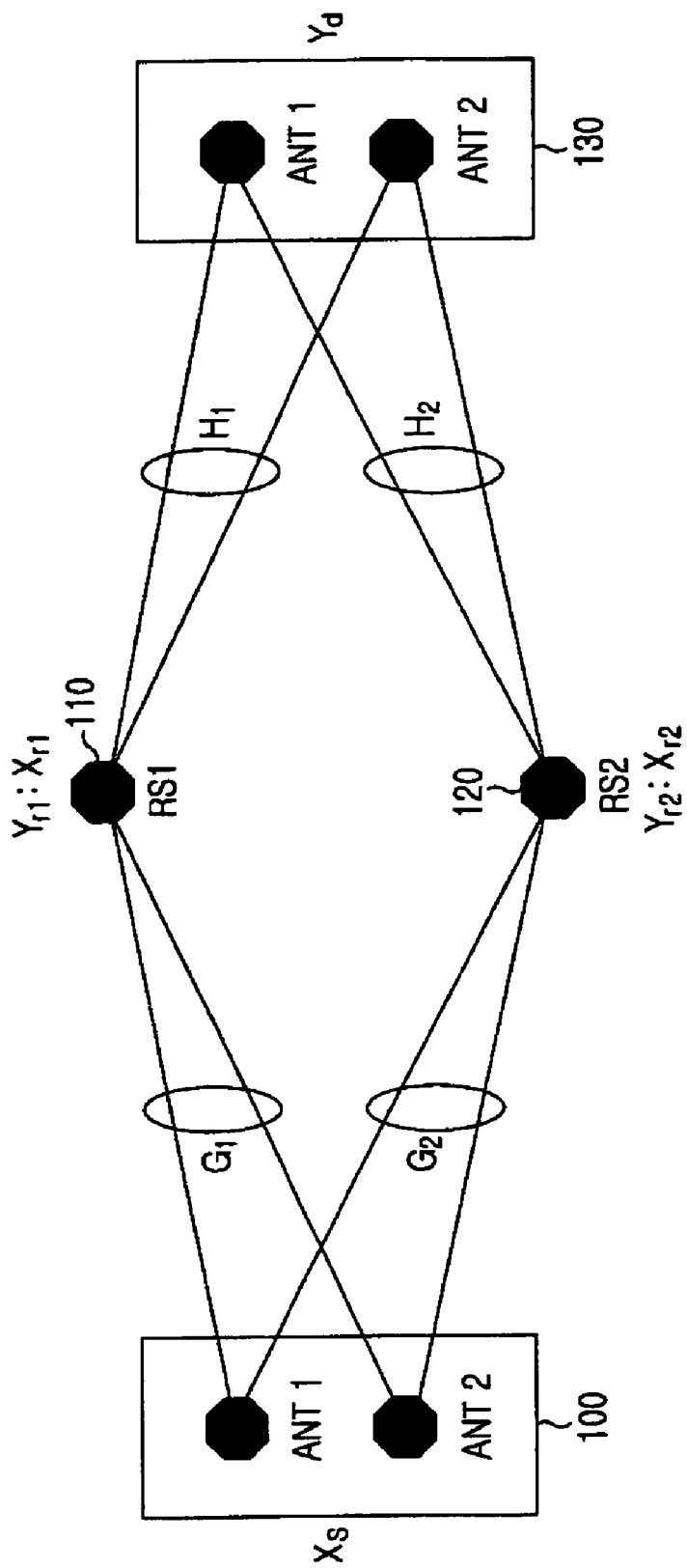
FIG. 1 is a diagram illustrating an example of a scenario of transmission/reception by each node in a multiple-antenna wireless communication system based on relay stations (RSs) according to an exemplary embodiment of the present invention.

FIG. 1 is a diagram illustrating an example of a scenario of transmission/reception by each node in a multiple-antenna wireless communication system based on relay stations (RSs) according to an exemplary embodiment of the present invention.

In FIG. 1, there are a source node 100, two relay stations (RSs) 110 and 120, and a destination node 130 in the scenario example. When the source node 100 is a mobile station (MS), the destination node 130 is a base station (BS). On the contrary, when the source node 100 is a BS, the destination node 130 is an MS.

Assuming that the source node 100 and the destination node 130 each have two transmit/receive antennas, and the RSs 110 and 120 each have one transmit/receive antenna, a channel between the source node 100 and the RSs 110 and 120 and a channel between the RSs 110 and 120 and the destination node 130 each can be expressed by a 2×2 matrix. A relationship between transmitted/received signals at each node is given in Equation 1 below:

$$y_{r1} = g_1 x_s + n_{r1},$$
$$y_{r2} = g_2 x_s + n_{r2},$$
$$y_d = h_1 x_{r1} + h_2 x_{r2} + n_d, \qquad \text{[Eqn. 1]}$$

where $y_{r1}$ is the signal received by RS1 110 from source node 100, $g_1$ is the channel matrix between RS1 110 and source node 100, $x_s$ is the signal transmitted by source node 100, $n_{r1}$ is the noise in RS1 110, $y_{r2}$ is the signal received by RS2 120 from source node 100, $g_2$ is the channel matrix between RS2 120 and source node 100, $n_{r2}$ is the noise in RS2 120, $y_d$ is the signal received by destination node 130 from RSs 110 and 120, $h_1$ is the channel matrix between RS1 110 and destination node 130, $h_2$ is the channel matrix between RS2 120 and destination node 130, $x_{r1}$ is the signal transmitted by RS1 110, $x_{r2}$ is the signal transmitted by RS2 120, and $n_d$ is the noise in destination node 130.

The source node 100 divides whole data into three streams, encodes and modulates each of the three streams at different transmission rates, multiplies the streams by beamforming vectors, and then transmits the streams. The three streams are encoded and modulated at a transmission rate at which the RS1 110 can perform decoding, at a transmission rate at which the RS2 120 can perform decoding, and at a transmission rate at which both the RS1 110 and RS2 120 can perform decoding, respectively. Here, a signal encoded and modulated at the transmission rate at which both the RS1 110 and RS2 120 can perform decoding is called "a common signal", and a signal encoded and modulated at the transmission rate at which each of the RS1 110 and the RS2 120 can perform decoding is called "a private signal". According to an embodiment, the source node 100 divides whole data into N number of streams according to the number of RSs performing cooperative communication and encodes and modulates the streams at a transmission rate at which each RS can perform decoding and at a transmission rate at which all RSs can perform decoding The RS1 110 and the RS2 120 each receive a signal obtained by encoding and modulating three streams at respective transmission rates and synthesizing the streams from the source node 100, decoding a common signal, and then decoding a private signal in a signal obtained by removing the common signal from the received signal. The RS1 110 and the RS2 120 re-encode and re-modulate the common signal and the private signal depending on a channel state, control a diversity gain and a multiplexing gain, and transmit the common signal and the private signal to the destination node 130.

The destination node 130 receives cooperative relay signals from the RS1 110 and the RS2 120, decodes a common signal, removes the common signal from the received signal, and decodes private signals in regular sequence.

As described above, exemplary embodiments of the present invention take into consideration a decode-and-forward scheme in which, if the source node 100 transmits a signal, the RS1 110 and RS2 120 each decode the signal, remove a noise effect, re-encode the signal, and relay and transmit the signal to the destination node 130. Also, exemplary embodiments of the present invention can be generally applied although several antennas are installed in each node. However, a description is made for convenience's sake, aiming at a case where one transmit/receive antenna is installed in an RS. When several antennas are installed in an RS, receive beamforming and transmit beamforming each are added in a transmission/reception process. This technology is already well known in the art and is not a key element of the present invention and, therefore, its detailed description is omitted.

An apparatus for transmission between the source node 100 and the RSs 110 and 120 is described below with reference to FIG. 2. An apparatus for reception between the source node 100 and the RSs 110 and 120 is described below with reference to FIG. 3. An apparatus for transmission between the RSs 110 and 120 and the destination node 130 is described below with reference to FIG. 4. An apparatus for reception between the RSs 110 and 120 and the destination node 130 is described below with reference to FIG. 5.

Figure 2:
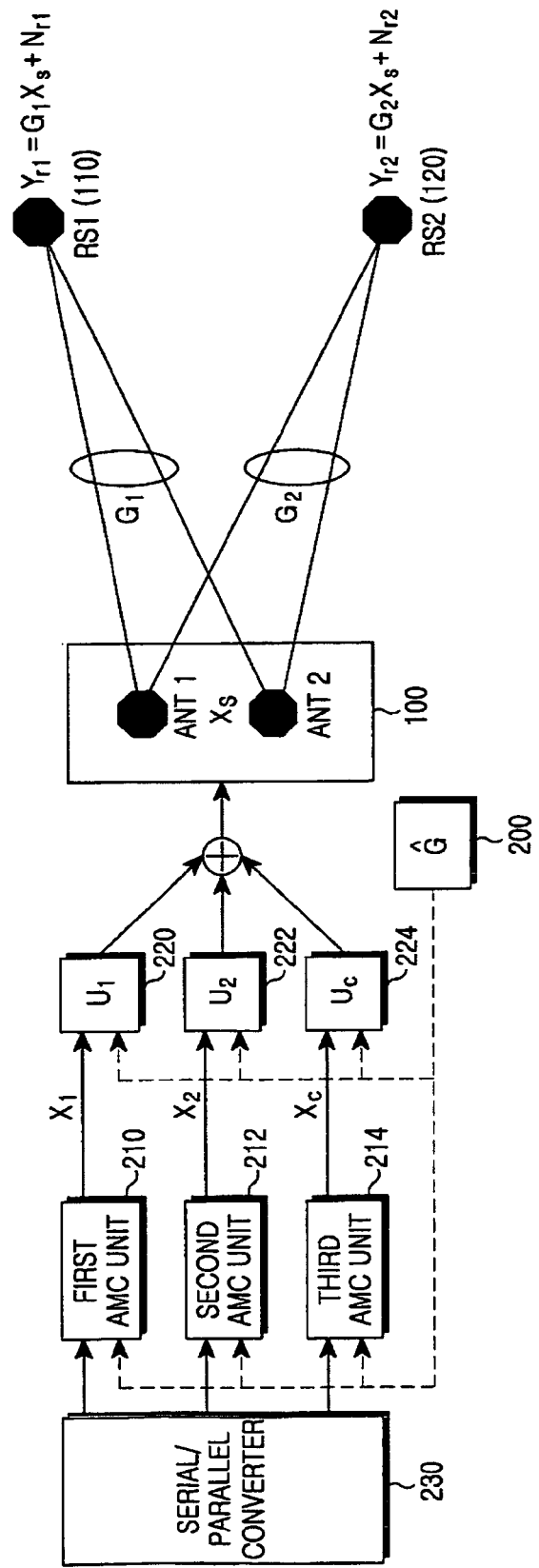
FIG. 2 is a diagram illustrating an apparatus for transmission between a source node and RSs according to an exemplary embodiment of the present invention.

FIG. 2 illustrates an apparatus for transmission between the source node 100 and the RSs 110 and 120 according to an exemplary embodiment of the present invention.

Referring to FIG. 2, the apparatus for transmission between the source node 100 and the RSs 110 and 120 includes a first adaptive modulation and coding (AMC) unit 210, a second AMC unit 212, a third AMC unit 214, a first beamforming unit 220, a second beamforming unit 222, a third beamforming unit 224, and a serial/parallel converter 230.

The serial/parallel converter 230 divides data into three substreams and provides the streams to the first AMC unit 210, the second AMC unit 212, and the third AMC unit 214.

The first AMC unit 210 encodes and modulates a first stream using a coding rate and a modulation order information that is determined on the basis of a channel information 200. The first stream has to be encoded at a transmission rate at which the RS1 110 can perform decoding. According to an embodiment, the channel information between the source node 100 and the RSs 110 and 120 is fed back from the RSs 110 and 120.

The first beamforming unit 220 multiples a signal ($x_1$) encoded and modulated in the first AMC unit 210 by a beamforming vector ($u_1$). The beamforming vector ($u_1$) is determined on the basis of the channel information 200.

The second AMC unit 212 encodes and modulates a second stream using the coding rate and the modulation order information that is determined on the basis of the channel information 200. The second stream has to be encoded at a transmission rate at which the RS2 120 can perform decoding.

The second beamforming unit 222 multiples a signal ($x_2$) encoded and modulated in the second AMC unit 212 by a beamforming vector ($u_2$).

Similarly, the third AMC unit 214 encodes and modulates a third stream using a coding rate and a modulation order information that is determined on the basis of the channel information 200. The third stream has to be encoded at a transmission rate at which both the two RSs 110 and 120 can perform decoding.

The third beamforming unit 224 multiples a signal ($x_c$) encoded and modulated in the third AMC unit 214 by a beamforming vector ($u_c$).

Signals output from the first beamforming unit 220, the second beamforming unit 222, and the third beamforming unit 224 are added ($x_s = x_1 \cdot u_1 + x_2 \cdot u_2 + x_c \cdot u_c$) and are transmitted through two transmit antennas.

In other words, after whole data is divided into three substreams in the source node 100, each substream is encoded and modulated at a different transmission rate, the modulated substreams are multiplied by beamforming vectors, and the multiplied substreams are added and transmitted. A coding rate and a modulation order for each stream are determined by an adaptive modulation and coding (AMC) scheme on the basis of information on a measurement of a channel matrix ($\hat{G}$). Any coding/modulation and beamforming scheme well known in a multiple input multiple output (MIMO) downlink (DL) can be applied and can be selected in consideration of a tradeoff between performance and complexity according to a communication environment. This technology is already well known in the art and, therefore, its detailed description is omitted.

Figure 3:
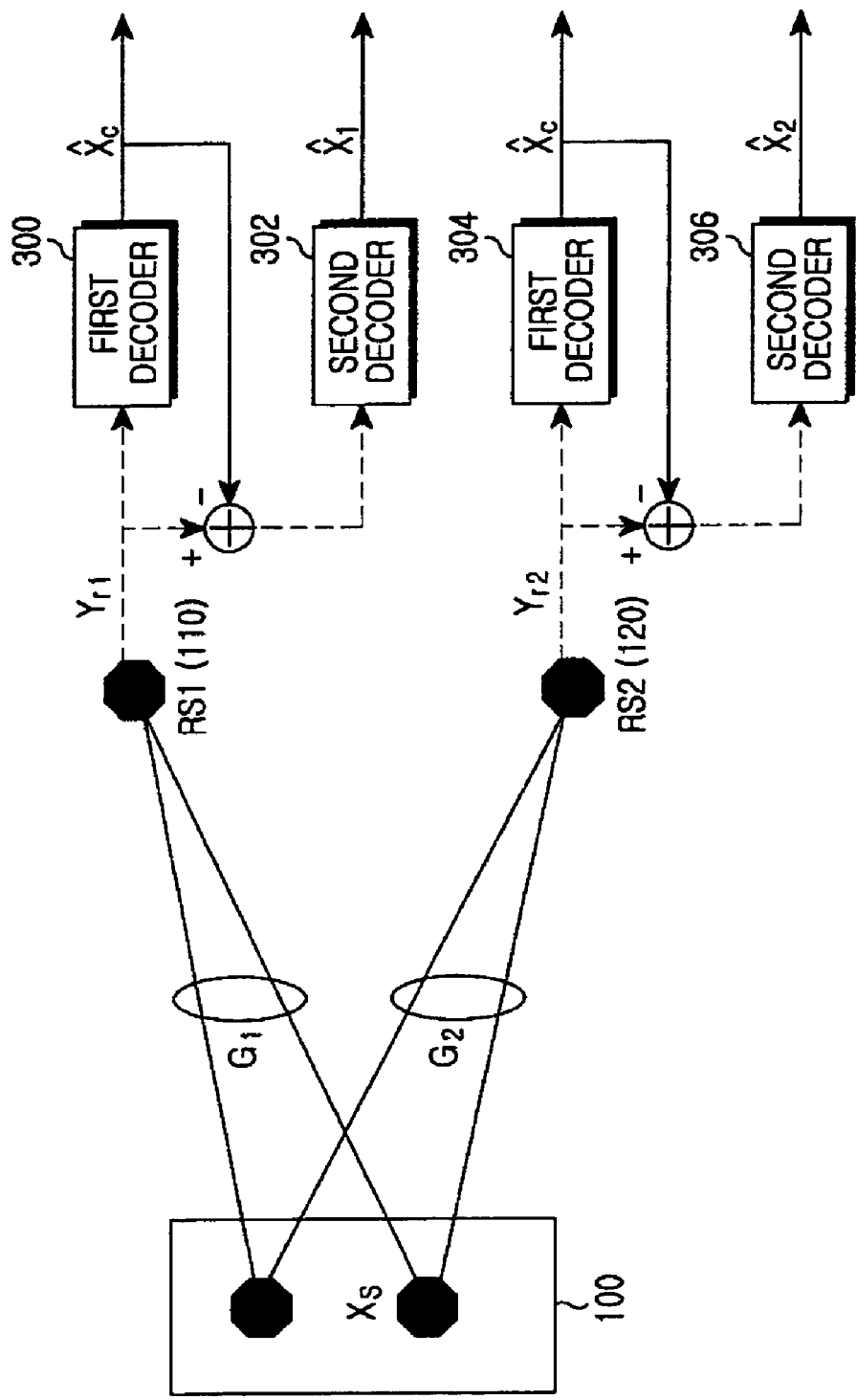
FIG. 3 is a diagram illustrating an apparatus for reception between a source node and RSs according to an exemplary embodiment of the present invention.

FIG. 3 is a diagram illustrating an apparatus for reception between a source node 100 and RSs 110 and 120 according to an exemplary embodiment of the present invention.

Referring to FIG. 3, the apparatus for reception between the source node 100 and the RS1 110 includes a first decoder 300 and a second decoder 302. The apparatus for reception between the source node 100 and the RS2 120 includes a first decoder 304 and a second decoder 306. The RS1 110 receives a signal ($y_{r1}$) from the source node 100, and the RS2 120 receives a signal ($y_{r2}$) from the source node 100. The signal ($y_{r1}$) is expressed by $y_{r1} = g_1 \cdot x_s + n_{r1}$, and the signal ($y_{r2}$) is expressed by $y_{r2} = g_2 \cdot x_s + n_{r2}$.

In the RS1 110, the first decoder 300 receives the signal ($y_{r1}$) from the source node 100 and decodes a common signal ($x_c$). The common signal ($x_c$) is a signal that the RS1 110 and RS2 120 can both decode.

The second decoder 302 receives a signal obtained by removing the common signal ($x_c$) from the signal ($y_{r1}$) and decodes a private signal ($x_1$). The private signal ($x_1$) is a signal that the RS1 110 can decode.

In the RS2 120, the first decoder 304 receives the signal ($y_{r2}$) from the source node 100 and decodes a common signal ($x_c$). The common signal ($x_c$) is a signal that the RS1 110 and RS2 120 can both decode.

The second decoder 306 receives a signal obtained by removing the common signal ($x_c$) from the signal ($y_{r2}$) and decodes a private signal ($x_2$). The private signal ($x_2$) is a signal that the RS2 120 can decode.

According to an embodiment, each RS 110 and 120 performs decoding in two schemes: simultaneous decoding and successive decoding. In the successive decoding scheme, as in FIG. 3, a common signal ($x_c$) is decoded using a decision feedback structure and then is removed from a received signal and a private signal ($x_1$) is decoded. The successive decoding scheme has an advantage of being capable of reducing decoding complexity but has a disadvantage of causing error propagation upon failure of signal ($x_c$) decoding. The simultaneous decoding scheme using joint maximum likelihood detection generally shows better decoding performance because of no error propagation but has a disadvantage of high complexity.

Figure 4:
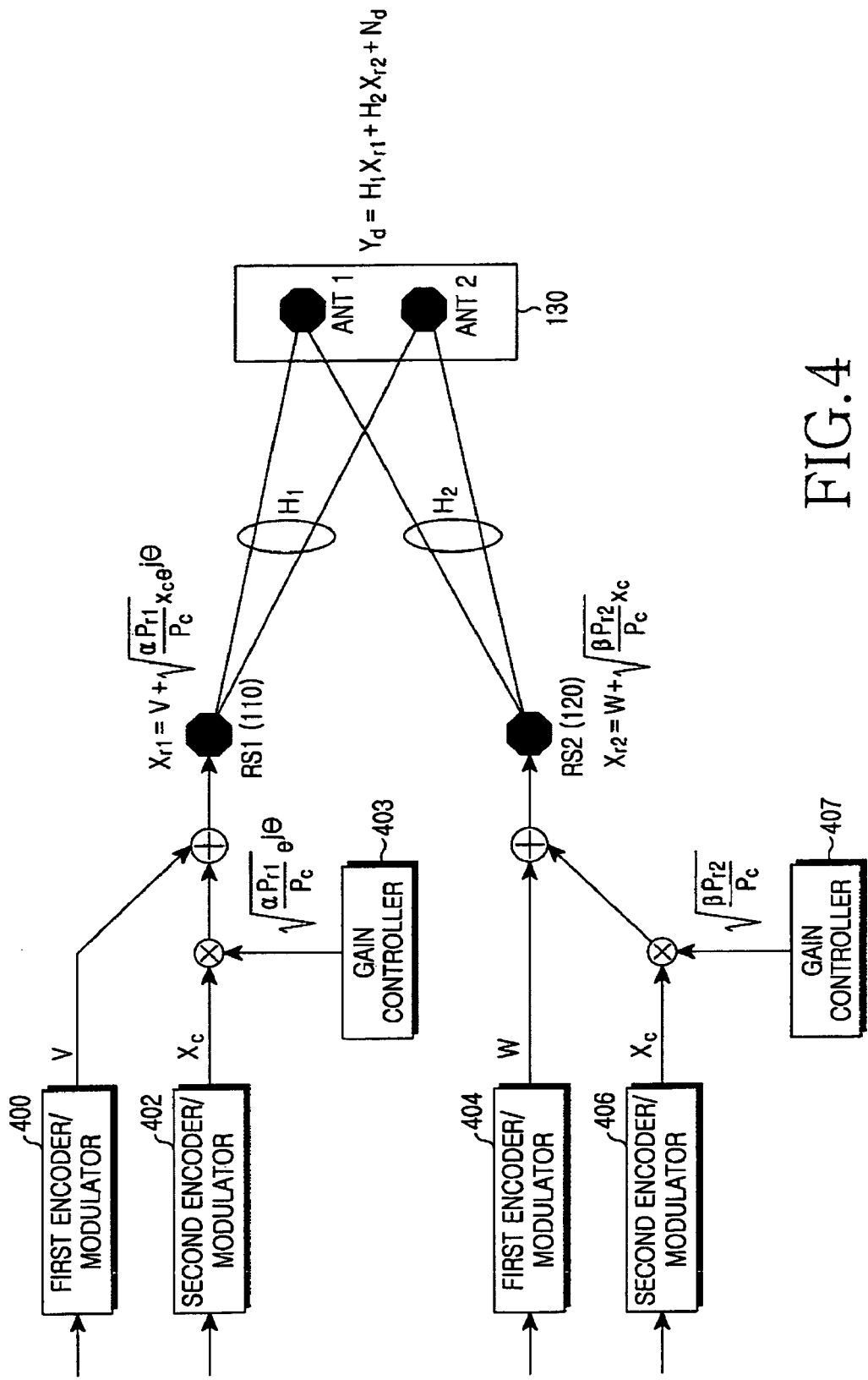
FIG. 4 is a diagram illustrating an apparatus for transmission between RSs and a destination node according to an exemplary embodiment of the present invention.

FIG. 4 is a diagram illustrating an apparatus for transmission between RSs 110 and 120 and a destination node 130 according to an exemplary embodiment of the present invention.

Referring to FIG. 4, an apparatus for transmission between the RS1 110 and the destination node 130 includes a first encoder/modulator 400, a second encoder/modulator 402, and a gain controller 403. An apparatus for transmission between the RS2 120 and the destination node 130 includes a first encoder/modulator 404, a second encoder/modulator 406, and a gain controller 407.

In the RS1 110, the first encoder/modulator 400 performs encoding and modulation using information on a private signal ($x_1$) decoded in the second decoder 302 of FIG. 3 and then outputs a private signal (v). The private signal (v) is allocated a power of $\overline{\alpha}$ %.

The second encoder/modulator 402 performs encoding and modulation using information on a common signal ($x_c$) decoded in the first decoder 300 of FIG. 3 and then outputs a common signal ($x_c$). The common signal ($x_c$) is rotated by a phase angle ($\theta$) and allocated a power of $\alpha$ %.

The RS1 110 generates a transmitted signal ($x_{r1}$) by multiplying the common signal ($x_c$) by a gain from the gain controller 403 and adding the private signal (v) to the multiplication result. The transmitted signal ($x_{r1}$) is expressed in Equation 2 below.

Similarly, in the RS2 120, the first encoder/modulator 404 performs encoding and modulation using information on a private signal ($x_2$) decoded in the second decoder 306 of FIG. 3 and then outputs a private signal (w). The private signal (w) is allocated a power of $\overline{\beta}$ %.

The second encoder/modulator 406 performs encoding and modulation using information on a common signal ($x_c$) decoded in the first decoder 304 of FIG. 3 and then outputs a common signal ($x_c$). The common signal ($x_c$) is allocated a power of $\beta$ %.

The RS2 120 generates a transmitted signal ($x_{r2}$) by multiplying the common signal ($x_c$) by a gain from the gain controller 407 and adding the private signal (w) to the multiplication result. The transmitted signal ($x_{r2}$) is expressed in Equation 2 below:

$$x_{r1} = v + \sqrt{\frac{\alpha P_{r1}}{P_c}} x_c e^{j\theta}, \quad x_{r2} = w + \sqrt{\frac{\beta P_{r2}}{P_c}} x_c \quad \text{[Eqn. 2]}$$

$$E[|x_c|^2] = P_c \quad 0 \le \alpha \le 1 \quad \overline{\alpha} = 1 - \alpha,$$

$$E[x_{r1} x_{r2}^*] = \sqrt{\alpha P_{r1} \beta P_{r2}} \, e^{j\theta} \quad 0 \le \beta \le 1 \quad \overline{\beta} = 1 - \beta,$$

where $x_{r1}$ is the signal transmitted by RS1 110 to destination node 130, $x_{r2}$ is the signal transmitted by RS2 120 to destination node 130, $\alpha$, $\beta$ is the amount of power allocated to common signal ($x_c$), $P_{r1}$ is the power of private signal (v), $P_c$ is the power of common signal ($x_c$), $P_{r2}$ is the power of private signal (w), and $\theta$ is the angle between channel ($h_1$) and channel ($h_2$).

The gain controllers 403 and 407 determine parameters ($\alpha$, $\beta$, $\theta$) controlling a multiplexing gain and a diversity gain on the basis of channel matrix (H) information. That is, when a signal to noise ratio (SNR) is enough high or two row vectors of a channel matrix are close to orthogonal, the gain controllers 403 and 407 allocate almost all the power to a private signal and generate multiplexing gains. When the SNR is very low or the two row vectors are almost close to parallel, the gain controllers 403 and 407 allocate almost all the power to a common signal and generate diversity gains.

A spectral efficiency in a second hop can be given by an expression of log det(I+HQ$_r$H$^+$) bits/sec/Hz. Parameters maximizing this can be calculated on the basis of Equation 3 below:

Spectral efficiency=log det($I+HQ_rH^+$). [Eqn. 3]

In Equation 3, the 'I' is a unit matrix, the 'H' is a channel matrix, the 'H$^+$' is a conjugate transpose matrix of the 'H', and the '$Q_r$' is a covariance matrix and is expressed in Equation 4 below. The 'det' represents a determinant.

$$Q_r = E[X_r X_r^+] = \begin{bmatrix} P_{r1} & \sqrt{\alpha P_{r1} \beta P_{r2}} \, e^{j\theta} \\ \sqrt{\alpha P_{r1} \beta P_{r2}} \, e^{-j\theta} & P_{r2} \end{bmatrix} \quad \text{[Eqn. 4]}$$

$$X_r = \begin{bmatrix} x_{r1} \\ x_{r2} \end{bmatrix}$$

In Equation 4, the '$x_{r1}$' is a signal transmitted by the RS1 110 to the destination node 130, the '$x_{r2}$' is a signal transmitted by the RS2 120 to the destination node 130, the '$P_{r1}$' is the power of a private signal (v), the '$P_{r2}$' is the power of a private signal (w), the '$\alpha$' and '$\beta$' are amounts of power allocated to a common signal ($x_c$), and the '$\theta$' is an angle between a channel ($h_1$) and a channel ($h_2$). A correlation coefficient ($\rho$) is calculated in Equation 5 below:

$$\rho = \frac{E[x_{r1} x_{r2}^*]}{\sqrt{P_{r1} P_{r2}}} = \sqrt{\alpha \beta} \, e^{j\theta}. \quad \text{[Eqn. 5]}$$

In Equation 5, the '$\rho$' is a correlation coefficient, the '$P_{r1}$' is the power of a private signal (v), the '$P_{r2}$' is the power of a private signal (w), and the '$E[x_{r1} x_{r2}^*]$' is a covariance operation for a signal ($x_{r1}$) and a signal ($x_{r2}$). If being separated by a size and a phase angle, the correlation coefficient ($\rho$) is expressed in Equation 6 below:

$$\angle \rho = \theta = \angle(h_1^+ h_2) \quad \text{[Eqn. 6]}$$

$$|\rho| = \sqrt{\alpha \beta} = \min\left(\frac{|h_1^+ h_2|}{\sqrt{P_{r1} P_{r2}} \det(H^+ H)}, 1\right).$$

In Equation 6, the '$h_1$' is a channel matrix between the RS1 110 and the destination node 130, the '$h_1^+$' is a conjugate transpose matrix of the '$h_1$', and the '$h_2$' is a channel matrix between the RS2 120 and the destination node 130. The 'H' is a channel matrix between both the RS1 110 and RS2 120 performing cooperative relay and the destination node 130. The 'H+' is a conjugate transpose matrix of the 'H'. That is, the 'α', 'β' are determined as values that satisfy Equation 6 and maximize the spectral efficiency of Equation 3. The 'θ' is determined as an angle between the '$h_1^+$' and the '$h_2$'. A rotation of a phase angle (θ) can be performed in each of two RSs, and although one RS is fixed in its phase angle and the other RS is adjusted in its phase angle, the same effect is achieved. Therefore, in this disclosure, a description is made on the assumption that a phase angle of the RS1 110 is rotated by θ.

As described above, exemplary embodiments of the present invention are to obtain a maximal spectrum value by introducing a common signal that two RSs can all decode and optimizing a correlation between two RS signals. Like a spatial multiplexing scheme, this scheme operates by allocating almost all the power to a private signal when an SNR is enough high or two row vectors of a channel matrix (H) are close to orthogonal. In this case, a signal transmitted through the RS1 110 and a signal transmitted through the RS2 120 include completely different data. On the contrary, like a receive (Rx) beamforming scheme, the scheme operates by allocating almost all the power to a common signal when the SNR is very low or the two row vectors of the channel matrix (H) are almost close to parallel. Also, because the same signal is forwarded through two RSs, a path diversity gain in a fading channel can be obtained.

Figure 5:
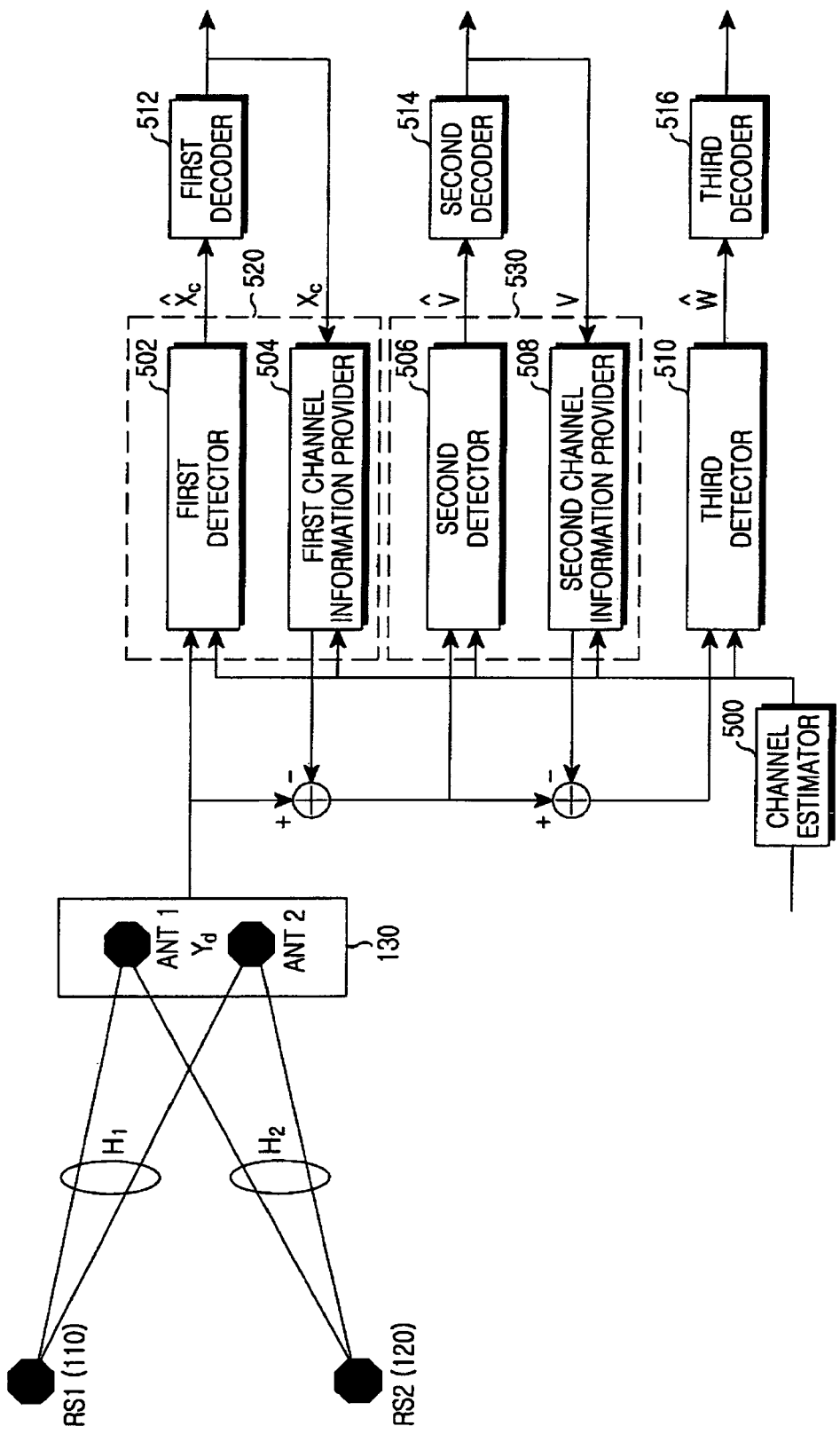
FIG. 5 is a diagram illustrating an apparatus for reception between RSs and a destination node according to an exemplary embodiment of the present invention.

FIG. 5 is a diagram illustrating an apparatus for reception between RSs 110 and 120 and a destination node 130 according to an exemplary embodiment of the present invention. Exemplary embodiments of the present invention may decode the entire stream at one time using joint maximum likelihood detection but use a decision feedback structure for complexity reduction.

A signal ($y_d$) received by the destination node 130 over channels ($h_1$ and $h_2$) is expressed in Equation 7 below:

$$y_d = h_1 x_{r1} + h_2 x_{r2} + n_d \quad [\text{Eqn. 7}]$$

$$= h_1\left(v + \sqrt{\frac{\alpha P_{r1}}{P_c}} x_c e^{j\theta}\right) + h_2\left(w + \sqrt{\frac{\beta P_{r2}}{P_c}} x_c\right) + n_d$$

$$= h_1 v + h_2 w + \left(h_1 \sqrt{\frac{\alpha P_{r1}}{P_c}} e^{j\theta} + h_2 \sqrt{\frac{\beta P_{r2}}{P_c}}\right) x_c + n_d$$

$$= h_1 v + h_2 w + h_c x_c + n_d,$$

where $y_d$ is the signal received by destination node 130, $h_1$ is the channel matrix between RS1 110 and destination node 130, $h_2$ is the channel matrix between RS2 120 and destination node 130, $x_{r1}$ is the signal transmitted by RS1 110, $x_{r2}$ is the signal transmitted by RS2 120, $n_d$ is the noise of destination node 130, and $h_c$ is the channel matrix of common signal ($x_c$).

Referring to FIG. 5, the apparatus for reception between the RSs 110 and 120 and the destination node 130 includes a channel estimator 500, a first detector 502, a first channel information provider 504, a first decoder 512, a second detector 506, a second channel information provider 508, a second decoder 514, a third detector 510, and a third decoder 516.

The channel estimator 500 estimates a channel using pilot signals transmitted by the RSs 110 and 120 and then, provides corresponding channel information to the first detector 502, the first channel information provider 504, the second detector 506, the second channel information provider 508, and the third detector 510, respectively. That is, the channel estimator 500 provides $h_c$ channel information to the first detector 502 and the first channel information provider 504, provides $h_1$ channel information to the second detector 506 and the second channel information provider 508, and provides $h_2$ channel information to the third detector 510.

The first detector 502 receives the $h_c$ channel information from the channel estimator 500, estimates a minimum mean square error (MMSE) for a received signal ($y_d$), and detects a common signal ($\hat{x}_c$).

The first decoder 512 decodes the common signal ($\hat{x}_c$) detected by the first detector 502.

The first channel information provider 504 receives the $h_c$ channel information from the channel estimator 500 and multiplies a signal ($x_c$) decoded by the first decoder 512 by an $h_c$ channel.

The second detector 506 removes the signal from the first channel information provider 504 from a received signal ($y_d$), receives the $h_1$ channel information from the channel estimator 500, estimates an MMSE, and detects a private signal ($\hat{v}$).

The second decoder 514 decodes the private signal ($\hat{v}$) detected by the second detector 506.

The second channel information provider 508 receives the $h_1$ channel information from the channel estimator 500 and multiplies a signal (v) decoded by the second decoder 514 by an $h_1$ channel.

The third detector 510 removes the signal from the first channel information provider 504 and the signal from the second channel information provider 508 from a received signal ($y_d$), receives the $h_2$ channel information from the channel estimator 500 and detects a private signal ($\hat{w}$).

The third decoder 516 decodes the private signal ($\hat{w}$) detected by the third detector 510.

That is, exemplary embodiments of the present invention are based on a scheme of estimating an MMSE, decoding a signal $\hat{x}_c$, removing the decoded signal $x_c$ from a received signal, and successively decoding private signals ($\hat{v}$ and $\hat{w}$). Any receive beamforming/symbol detection/decoding scheme well known in the art such as a Vertical Bell Laboratories Layered Space Time (V-BLAST) scheme can be applied and can be selected in consideration of a tradeoff between performance and complexity depending on a communication environment.

Figure 6:
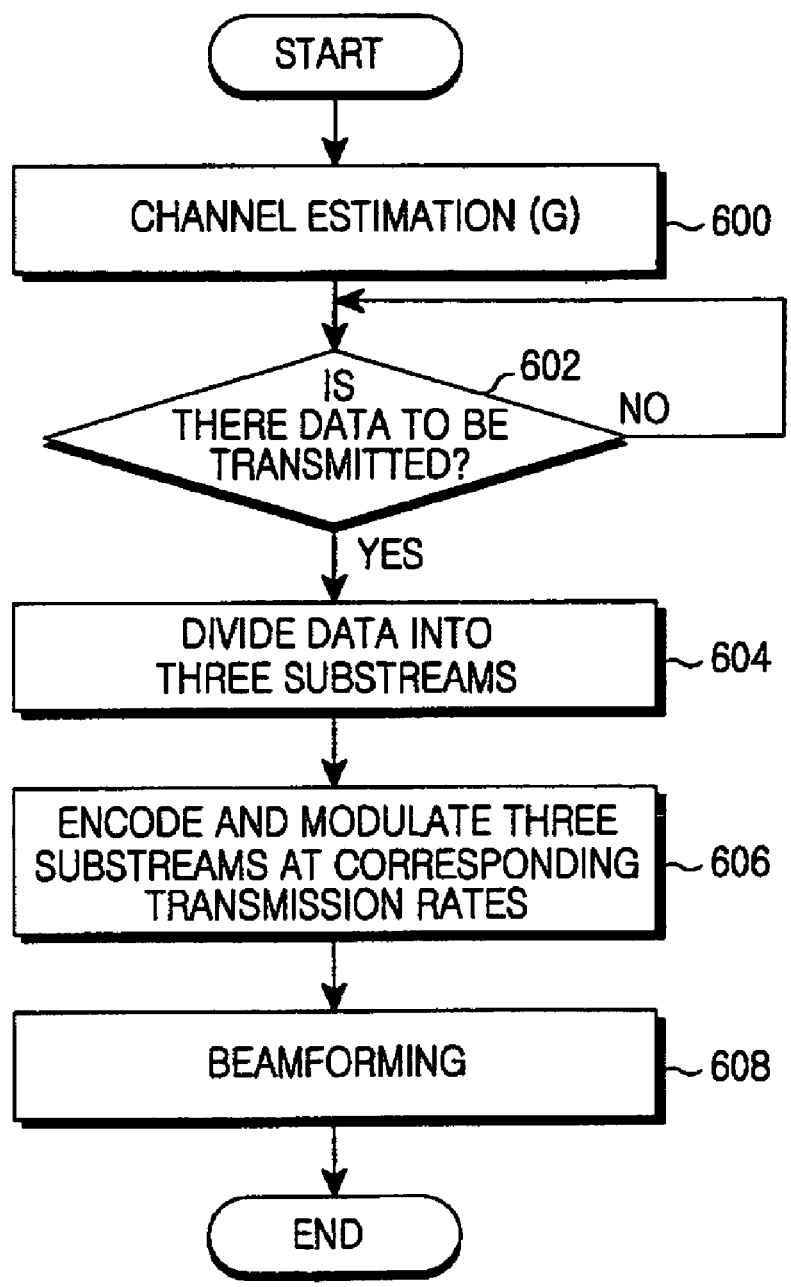
FIG. 6 is a flow diagram illustrating a process of transmission between a source node and RSs according to an exemplary embodiment of the present invention.

FIG. 6 is a flow diagram illustrating a process of transmission between a source node 100 and RSs 110 and 120 according to an exemplary embodiment of the present invention.

Referring to FIG. 6, in step 600, a transmit apparatus of the source node 100 performs channel estimation (G) using a DL pilot signal. According to embodiment, the transmit apparatus can also receive channel information fed back from the RS and determine a coding rate and a modulation scheme.

Then, the transmit apparatus identifies if there is data to be transmitted in step 602. If there is data to be transmitted, the transmit apparatus divides data into three substreams in step 604. If there is no data, the transmit apparatus repeatedly performs step 602.

Then, the transmit apparatus encodes and modulates the three substreams at corresponding transmission rates depending on channel estimation in step 606.

Thereafter, the transmit apparatus multiplies the encoded and modulated signal by a beamforming vector and transmits the multiplied signal through an antenna in step 608.

After that, the transmit apparatus terminates the process of an exemplary embodiment of the present invention.

Figure 7:
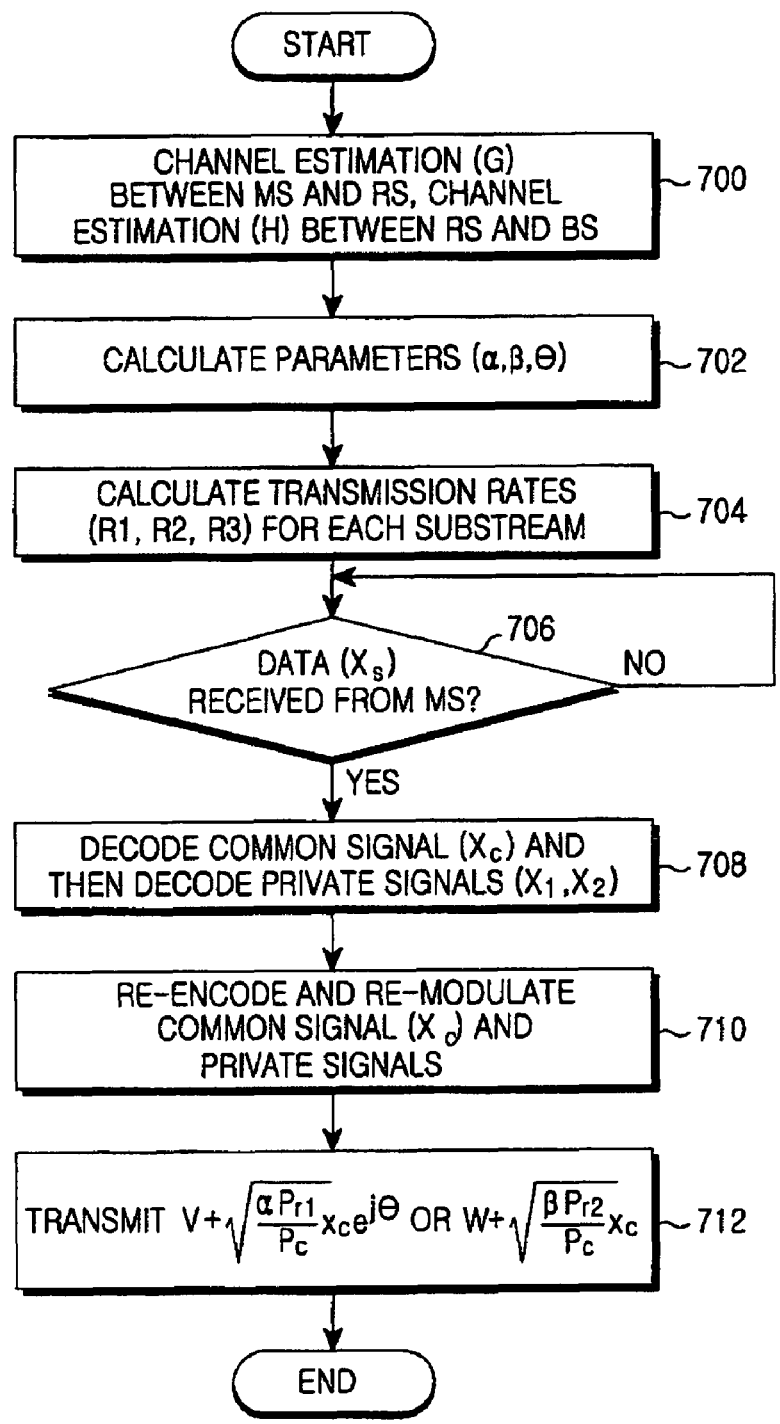
FIG. 7 is a flow diagram illustrating a process of transmission/reception between RSs and a destination node according to an exemplary embodiment of the present invention.

FIG. 7 is a flow diagram illustrating a process of transmission/reception between RSs 110 and 120 and a destination node 130 according to an exemplary embodiment of the present invention.

Referring to FIG. 7, the RS performs channel (G) estimation between a source node and the RS and channel (H) estimation between the RS and a destination node in step 700. According to an embodiment, the RS can receive and use the channel (G) estimation information fed back from the source node and channel (H) estimation information fed back from the destination node, respectively.

In estimating channel matrixes (G) and (H), a time division duplex (TDD) communication system can use a channel reciprocity well known in the art. A DL channel is estimated using a UL pilot signal, and a UL channel is estimated using a DL pilot signal. In a frequency division duplex (FDD) communication system, estimated values of channel matrixes (G) and (H) have to be fed back over a feedback channel. In order to reduce complexity, the FDD communication system can quantize and feed back a channel size and phase. Alternately, after an AMC level is predefined, a receiver determines an optimal AMC level based on channel information and then feeds back only an index.

Then, the RS calculates optimal parameter values ($\alpha$, $\beta$, and $\theta$) using information on channel matrixes (G) and (H) in step 702.

Then, the RS calculates transmission rates ($R_1$, $R_2$, and $R_3$) for each stream using the optimal parameter values ($\alpha$, $\beta$, and $\theta$) in step 704. The transmission rates are one example merely, and the RS can calculate a spectral efficiency assuming channel coding for Shannon capacity, optimal beamforming, and power allocation. In an embodiment, after an AMC level is predefined, an optimal AMC level can be determined on the basis of channel information. The transmission rate are calculated in Equation 8 below:

When decoding sequence is $x_c \rightarrow w \rightarrow v$, $R_1 = \log(1 + \overline{\alpha} P_{r1} \|h_1\|^2)$ $R_2 = \log \det(I + HQ_r^p H^+) - R_1$ $R_c = \log \det(I + HQ_r H^+) - R_1 - R_2$ when decoding sequence is $x_c \rightarrow v \rightarrow w$, $R_2 = \log(1 + \overline{\beta} P_{r2} \|h_2\|^2)$ $R_1 = \log \det(I + HQ_r^p H^+) - R_2$ $R_c = \log \det(I + HQ_r H^+) - R_1 - R_2$, [Eqn. 8]

where R1 is the transmission rate of RS1 110, R2 is the transmission rate of RS2 120, Rc is the common transmission rate of RS1 110 and RS2 120, $\overline{\alpha}$ is the parameter for controlling multiplexing gain and diversity gain of RS1 110, $\overline{\beta}$ is the parameter for controlling multiplexing gain and diversity gain of RS2 120, I is the unit matrix, H is the channel matrix, $H^+$ is the conjugate transpose matrix of H, $Q_r$ is the covariance matrix for two cooperative relay signal, and det is the determinant.

Then, if data ($x_s$) is received from the source node in step 706, the RS distinguishes a common signal ($x_c$) and private signals ($x_1$ and $x_2$), decodes the common signal ($x_c$), and then decodes the private signals ($x_1$ and $x_2$) in step 708. If not so, the RS repeatedly performs step 706.

Then, the RS performs re-encoding and re-modulation for the private signals ($x_1$ and $x_2$) and performs power allocation, phase rotation, and re-encoding and re-modulation for the common signal ($x_c$) in step 710.

Then, the RS transmits a synthesized signal (v or w) with a parameter for controlling a multiplexing gain and a diversity gain in step 712.

Then, the RS terminates the process of an exemplary embodiment of the present invention.

Figure 8:
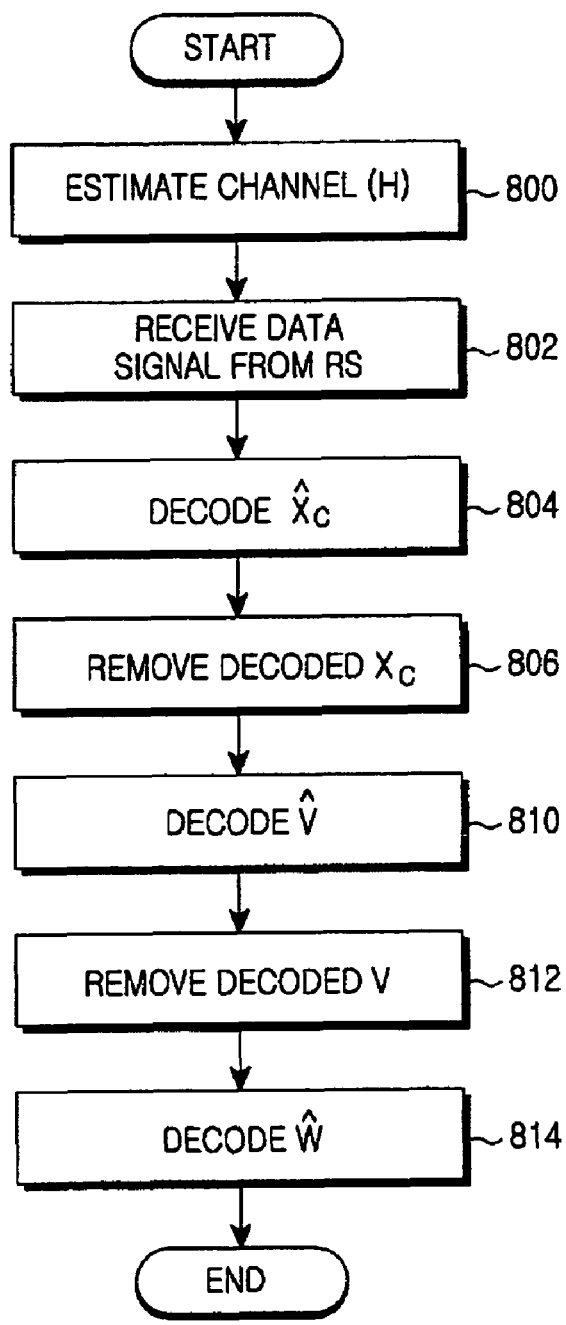
FIG. 8 is a flow diagram illustrating a process of reception between RSs and a destination node according to an exemplary embodiment of the present invention.

FIG. 8 is a flow diagram illustrating a process of reception between RSs 110 and 120 and a destination node 130 according to an exemplary embodiment of the present invention.

Referring to FIG. 8, a receive apparatus of the destination node 130 performs channel (H) estimation using a pilot signal in step 800. According to an embodiment, the receive apparatus can also receive and use channel (H) estimation information fed back from the RS.

Then, the receive apparatus receives a cooperative relay signal from the RS in step 802.

Thereafter, the receive apparatus decodes a common signal ($\hat{x}_c$) in step 804 and then, removes a common signal ($x_c$) from the received signal in step 806.

After that, the receive apparatus decodes a private signal ($\hat{v}$) among a signal obtained by removing the common signal ($x_c$) from the received signal in step 810 and removes the common signal ($x_c$) and a private signal (v) from the received signal in step 812.

Then, the receive apparatus decodes a private signal ($\hat{w}$) among a signal that is obtained by removing the common signal ($x_c$) and the private signal (v) from the received signal in step 814.

Then, the receive apparatus terminates the process of an exemplary embodiment of the present invention.

As described above, exemplary embodiments of the present invention have an advantage of being capable of improving the reliability of signal transmission and maximizing throughput by distinguishing a private signal and a common signal and calculating and applying a parameter for controlling a multiplexing gain and a diversity gain in a multiple-antenna wireless communication system based on RSs.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A transmit apparatus for a cooperative relay in a multiple-antenna wireless communication system based on relay stations, the apparatus comprising:
 a serial/parallel converter configured to divide data into N number of streams;
 a channel estimator configured to calculate a first transmission rate at which a relay station performing the cooperative relay can perform decoding and a second transmission rate at which all relay stations performing the cooperative relay can commonly perform decoding, and determine transmission rates for each of the N-number streams; and
 an adaptive modulation and coding (AMC) unit configured to encode and modulate the N-number streams according to the transmission rates.

2. The apparatus of claim 1, wherein the channel estimator is configured to receive one or more feedback parameters configured to optimize a signal correlation between the relay stations from the relay stations performing the cooperative relay relay, and the channel estimator also is configured to calculate the first transmission rate and the second transmission rate.

3. The apparatus of claim 1, further comprising: a beamforming unit configured to multiply an output signal from the AMC unit by a beamforming vector and form beamforming.

4. A relay reception apparatus for cooperative relay in a multiple-antenna wireless communication system based on relay stations, the apparatus comprising:

a first decoder configured to decode a common signal among a received signal that comprises a private signal and the common signal; and a second decoder configured to remove the decoded common signal from the received signal and decode the private signal, wherein the private signal is a signal encoded and modulated at a transmission rate at which a relay station performing the cooperative relay can perform decoding, and wherein the common signal is a signal encoded and modulated at a transmission rate at which all relay stations performing the cooperative relay can perform decoding.

5. A relay receive apparatus for cooperative relay in a multiple-antenna wireless communication system based on relay stations, the apparatus comprising:

an encoder/modulator for configured to re-encode and re-modulate a decoded private signal and a common signal on the basis of a channel estimation; and a signal synthesizer configured to apply a parameter configured to control a multiplexing gain and a diversity gain to the re-encoded and re-modulated private signal and common signal, and the signal synthesizer also is configured to synthesize the two signals, wherein the private signal is a signal encoded and modulated at a transmission rate at which a relay station performing the cooperative relay can perform decoding, and wherein the common signal is a signal encoded and modulated at a transmission rate at which all relay stations performing the cooperative relay can commonly perform decoding.

6. The apparatus of claim 5, further comprising: a gain controller configured to calculate a parameter configured to control the multiplexing gain and the diversity gain.

7. The apparatus of claim 6, wherein the gain controller is configured to generate the multiplexing gain by allocating almost all power to the private signal when a signal to noise ratio (SNR) is above a threshold or two row vectors of a channel matrix are close to orthogonal, and generate the diversity gain by allocating almost all power to the common signal when the signal to noise ratio is at or below the threshold or the two row vectors are close to parallel.

8. The apparatus of claim 5, wherein the gain controller is configured to calculate the parameter configured to control the multiplexing gain and the diversity gain on the basis of the channel estimation, and the gain control also is configured to optimize a correlation between cooperative relay signals.

9. A receive apparatus for cooperative relay in a multiple-antenna wireless communication system based on relay stations, the apparatus comprising:

a first detector configured to receive a cooperative relay signal from a plurality of relay stations and detect a common signal in the cooperative relay signal on the basis of a corresponding channel estimation information;

a first decoder configured to decode the detected common signal;

an $N^{th}$ detector configured to multiply the decoded common signal by a corresponding channel matrix and sequentially detect two or more private signals on the basis of the corresponding channel estimation information in a signal obtained by removing the detected common signal from the cooperative relay signal; and an $N^{th}$ decoder configured to decode the two or more detected private signals.

10. A transmission method for cooperative relay in a multiple-antenna wireless communication system based on relay stations, the method comprising:

dividing data into N number of streams;

calculating a first transmission rate at which a relay performing the cooperative relay can perform decoding and a second transmission rate at which all relay stations performing the cooperative relay can perform decoding, and determining a transmission rate for each of the N-number streams; and encoding and modulating each of the N-number streams according to the first and second transmission rates.

11. The method of claim 10, wherein calculating the transmission rates comprises:

receiving one or more feedback parameters optimizing a signal correlation between the relay stations from the relay stations performing the cooperative relay; and calculating the first transmission rate and the second transmission rate.

12. The method of claim 10, further comprising:

multiplying the modulated output signal by a beamforming vector and forming beamforming.

13. A relay reception method for cooperative relay in a multiple-antenna wireless communication system based on relay stations, the method comprising:

decoding a common signal from a received signal that comprises a private signal and the common signal; and removing the decoded common signal from the received signal and decoding the private signal, wherein the private signal is a signal encoded and modulated at a transmission rate at which a relay station performing the cooperative relay can perform decoding, and wherein the common signal is a signal encoded and modulated at a transmission rate at which all relay stations performing the cooperative relay can perform decoding.

14. A relay transmission method for cooperative relay in a multiple-antenna wireless communication system based on relay stations, the method comprising:

re-encoding and re-modulating a decoded private signal and a common signal on the basis of a channel estimation; and applying a parameter for controlling a multiplexing gain and a diversity gain to the re-encoded and re-modulated private signal and common signal and synthesizing the two signals, wherein the private signal is a signal encoded and modulated at a transmission rate at which a relay station performing the cooperative relay can perform decoding, and wherein the common signal is a signal encoded and modulated at a transmission rate at which all relay stations performing the cooperative relay can perform decoding.

15. The method of claim 14, further comprising: calculating the parameter for controlling the multiplexing gain and the diversity gain.

16. The method of claim 14, wherein the parameter is calculated on the basis of the channel estimation and optimizes a correlation between cooperative relay signals.

17. The method of claim 14, wherein the parameter generates a multiplexing gain by allocating almost all power to a private signal when a signal to noise ratio is above a threshold or two row vectors of a channel matrix are close to orthogonal, and generates a diversity gain by allocating almost all power to a common signal when the signal to noise ratio is at or below the threshold or the two row vectors are almost close to parallel.

18. A reception method for cooperative relay in a multiple-antenna wireless communication system based on relay stations, the method comprising:

receiving a cooperative relay signal from a plurality of relay stations and detecting a common signal in the cooperative relay signal on the basis of a corresponding channel estimation information;

decoding the detected common signal;

multiplying the decoded common signal by a corresponding channel matrix and sequentially detecting one or more private signals on the basis of the corresponding channel estimation information from a signal obtained by removing the common signal from the cooperative relay signal; and decoding the detected private signals.

* * * * *